United States Patent [19]

Van Rumpt

[11] Patent Number: 4,669,094
[45] Date of Patent: May 26, 1987

[54] FSK DATA RECEIVER

[75] Inventor: Herman W. Van Rumpt, Bois-le-Duc, Netherlands

[73] Assignee: U.S. Philip Corporation, New York, N.Y.

[21] Appl. No.: 728,116

[22] Filed: Apr. 29, 1985

[30] Foreign Application Priority Data

Apr. 27, 1984 [NL] Netherlands .......................... 8401347

[51] Int. Cl.$^4$ ............................................... H03D 3/00
[52] U.S. Cl. ........................................ 375/88; 375/97; 329/112; 329/122
[58] Field of Search ............ 375/80, 88, 91, 97, 375/89; 455/205, 208; 307/520, 524; 329/107, 112, 122, 150, 153, 154

[56] References Cited

U.S. PATENT DOCUMENTS

| | | | |
|---|---|---|---|
| 2,715,677 | 8/1955 | Turner | 375/91 |
| 4,254,503 | 3/1981 | Vance | 375/88 |
| 4,291,275 | 9/1981 | Nossen | 375/89 |
| 4,462,107 | 7/1984 | Vance | 375/88 |
| 4,523,324 | 6/1985 | Marshall | 375/91 |

Primary Examiner—Robert L. Griffin
Assistant Examiner—Stephen Chin
Attorney, Agent, or Firm—David R. Treacy

[57] ABSTRACT

For receiving frequency shift keyed data, a local oscillator generates a signal which is frequency shifted through a fixed frequency relative to the carrier signal, and is mixed with the received FSK signal. A circuit processes the mixer output to emphasize the energy content of signals located at the ends of the receiver passband, over signals located toward the center of the pass band. The output of that circuit is integrated to provide the AFC signal to the voltage-controlled local oscillator.

9 Claims, 6 Drawing Figures

FSK DATA RECEIVER

BACKGROUND OF THE INVENTION

The invention relates to a frequency-shift-keyed (FSK) data receiver comprising a mixer stage in which a received FSK signal, having a carrier frequency $f_c$ which is frequency-modulated by a data signal to produce a given frequency swing. $\Delta f$, and a local oscillator signal produced by a voltage-controlled oscillator with a signal frequency $f_L$ located within the band of the receiver, are mixed. Relative to the carrier signal frequency $f_c$, the local oscillator frequency is shifted through a given value $\delta f$. A bandpass filter is connected to the mixer stage, a detection circuit is connected to the bandpass filter for recovering the data signal from the sum and difference-frequency signals $\Delta f \pm \delta f$ produced by the mixer stage, and an AFC control loop is connected between the detection circuit and the voltage-controlled oscillator.

Such a receiver is disclosed in United Kingdom patent application No. 8132181, to which U.S. Pat. No. 4,523,324 corresponds. In this receiver the sum and difference signal frequencies are filtered in separate filters after having passed the bandpass filter and are applied to a differential amplifier. This differential amplifier checks whether at that moment a high or a low signal level of the transmitted data signal is received.

The AFC control loop comprises a mixer stage to which a separate oscillator having a signal frequency equal to the frequency swing $\Delta f$ is connected. The sum and difference signal frequencies applied to this mixer stage are down-transformed, whereafter the signal component having the given frequency value $\delta f$ is obtained with the aid of a low-pass filter. This signal component is converted into a control voltage for the voltage-controlled oscillator with the aid of a frequency-voltage converter.

This receiver has the disadvantage that at least three sharp filters are used which, for production in accordance with integrated circuit techniques requires many external capacitors and a correspondingly large number of connections. In addition, the AFC loop comprises an additional oscillator. In the receiver a controllable intermediate-frequency amplifier having a large dynamic range is required, which necessitates a large amount of current, which makes integration still more difficult. AM noise is not suppressed. Finally, the AFC loop used does not work satisfactorily with small input signals which however still have an adequately large S/N ratio to enable adequate detection. The reason for this AFC failure is that for such small input signals the loop can lock onto several frequencies, more specifically onto noise signals.

In certain applications such as pagers very severe requirements are imposed on the sensitivity, the selectivity and the consumed power. Thus, in England a sensitivity of 10 $\mu$V/m, a selectivity of $-65$ dB at $\pm 25$ kHz and a power dissipation less than 6 mW is required for an aerial having a length of 3 cm in the frequency band for pagers from 148–152 MHz.

SUMMARY OF THE INVENTION

The object of the invention is to provide a novel FSK data receiver arrangement which eliminates these disadvantages; and more specifically, a receiver which has a high selectivity, combined with a wide pull in-range for the AFC control loop and which is easy to integrate.

According to the invention, an FSK data receiver as described in the first paragraph includes a means for emphasising the energy content of signals having frequencies located near the ends of the passband of the receiver, over signals having intervening frequency signals; and an integrator coupled to the means for emphasising the energy content of signals, having frequencies located near the ends of the passband, for generating an AFC control signal for the voltage-controlled oscillator.

This has the advantage that only one filter must be provided, which can be a very narrow-band filter. Further, the AFC loop still has a wide pull-in range, is simple to integrate and enables a high signal-to-noise ratio.

Preferably, the energy-emphasizing means comprise the bandpass filter and the detection circuit. The bandpass filter has two peaks located around the signals having frequencies located near the ends of the passband, and the detection circuit comprises a limiter connected to the bandpass filter and a frequency-voltage converter having such a characteristic that the absolute value of the output voltage for the signals having frequencies located near the ends of the passband of the bandpass filter exceeds the output voltage for the signals having intervening signal frequencies.

Such a filter and detection circuit can be produced in a simple manner.

According to a different embodiment, the energy-emphasizing means comprise the detection circuit and a non-linear detector arranged in the AFC control loop. The detection circuit comprises a frequency-voltage converter having such a characteristic that the absolute value of the output voltage for the signals having frequencies located near the ends of the passband of the bandpass filter exceeds the output voltage for the signals having intervening signal frequencies.

Making such circuits is at least equally simple as the double-peaked filter.

Finally, in still another embodiment, the means comprise the detection circuit, which comprises a frequency-voltage converter having an amplitude and phase characteristic which is a non-linear function of the frequency. This characteristic is mirror-symmetrical relative to a reference point and the AFC control loop comprises a rectifier arranged between the converter and the integrator.

The invention and its advantages will be described in greater detail by way of example with reference to the embodiments shown in the accompanying figures.

DESCRIPTION OF THE PREFERRED EMBODIMENT

Figure 1:
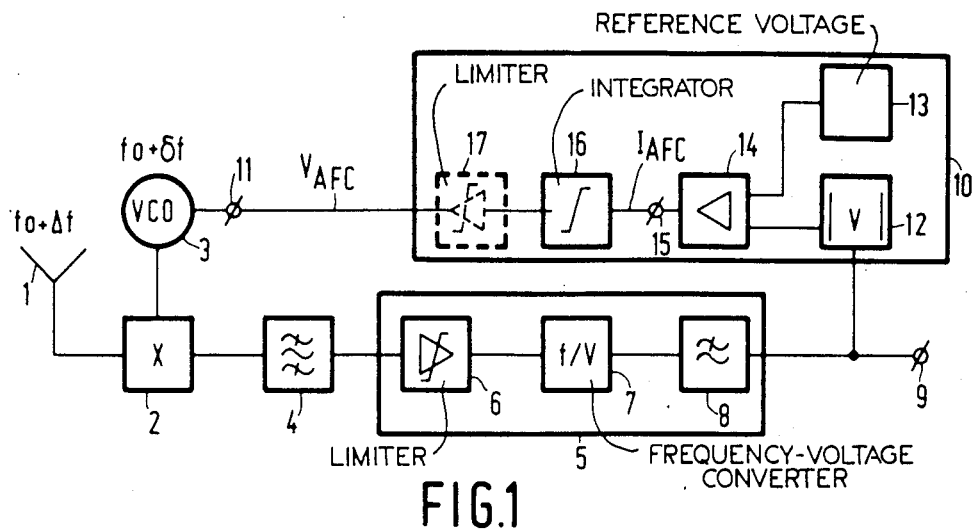
FIG. 1 is a block circuit diagram of the FSK data receiver according to the invention.

The FSK data receiver shown in FIG. 1 is arranged for receiving a carrier signal which is frequency-modulated by a data signal, for example a data signal of 512 b/s frequency-modulating a carrier signal having a frequency $f_c$ of 150 MHz with a frequency swing $\Delta f$ of 4.5 kHz. Such an FSK signal having the frequencies $f_c \pm \Delta f$ determined by the logic signal values of the data signal is applied, after reception by the aerial 1, to a mixer circuit 2. A signal produced by a local oscillator 3 and having a frequency $f_L$ is also applied to this mixer circuit. The frequency $f_L$ is chosen such that it is frequency-shifted through a given small value $\delta f$ relative to the carrier frequency $f_c$, so that it is well within the band of the receiver. $\delta f$ has, for example, a value equal to 750 Hz.

The sum and difference-frequency signals $\Delta f + \delta f$ and $\Delta f - \delta f$ are formed in the mixer circuit 2. These signals are consequently mutually shifted through a frequency of $2\delta f$. Because of this frequency shift it is possible to recover the logic values of the data signal in a simple manner.

To that end, these signals are applied to a detection circuit 5 after having been filtered in a bandpass filter 4. This detection circuit comprises a first limiter 6, a frequency-voltage converter 7 and a low-pass filter 8. The limiter 6 is used, among other things for suppressing AM noise. The frequency-voltage converter is, for example, a Foster-Seeley discriminator as is described, for example, in the article "Foster-Seeley Discriminator" by C. G. Mayo and J. W. Head, published in Electron. Radio Egnr. February 1958. Such a discriminator has an amplitude and phase characteristic which is a linear function of the frequency. If the reference point of the characteristic is chosen at the frequency $\Delta f$, the points on the characteristic curve for the frequencies are located plus and minus $\delta f$ symmetrically relative to this reference point; and at these frequencies $+\delta f$ and $-\delta f$, equal but opposite output voltages compared with the voltage level determined by the reference points are supplied.

These output voltages are filtered by the low-pass filter 8 with a frequency at the breakpoint of approximately 250 Hz for a 512 b/s data signal. The data signal thus recovered is applied to an output 9 of the receiver.

In addition, the data receiver comprises an AFC control loop including an AFC circuit 10 connected between the output 9 and a control input 11 of the voltage-controlled oscillator 3, for having the voltage-controlled oscillator vary with the frequency drift of the input signal. This control circuit 10 comprises a detector 12, a reference voltage source 13, a differential amplifier 14, an integrator 16 and optionally a second limiter 17. A signal produced by the detector 12 is applied together with the reference voltage produced by the reference voltage source 13 to the differential amplifier 14, which has a current output 15. In the differential amplifier the voltage difference between the input signals is determined and converted into an output current $I_{AFC}$ proportional thereto. This output current $I_{AFC}$ is applied to the integrator 16. The output voltage of integrator 16 is applied as a control signal to the control input 11 of the voltage-controlled oscillator 3, through the optional second limiter 17.

Figures 2, 3, 4, 5:
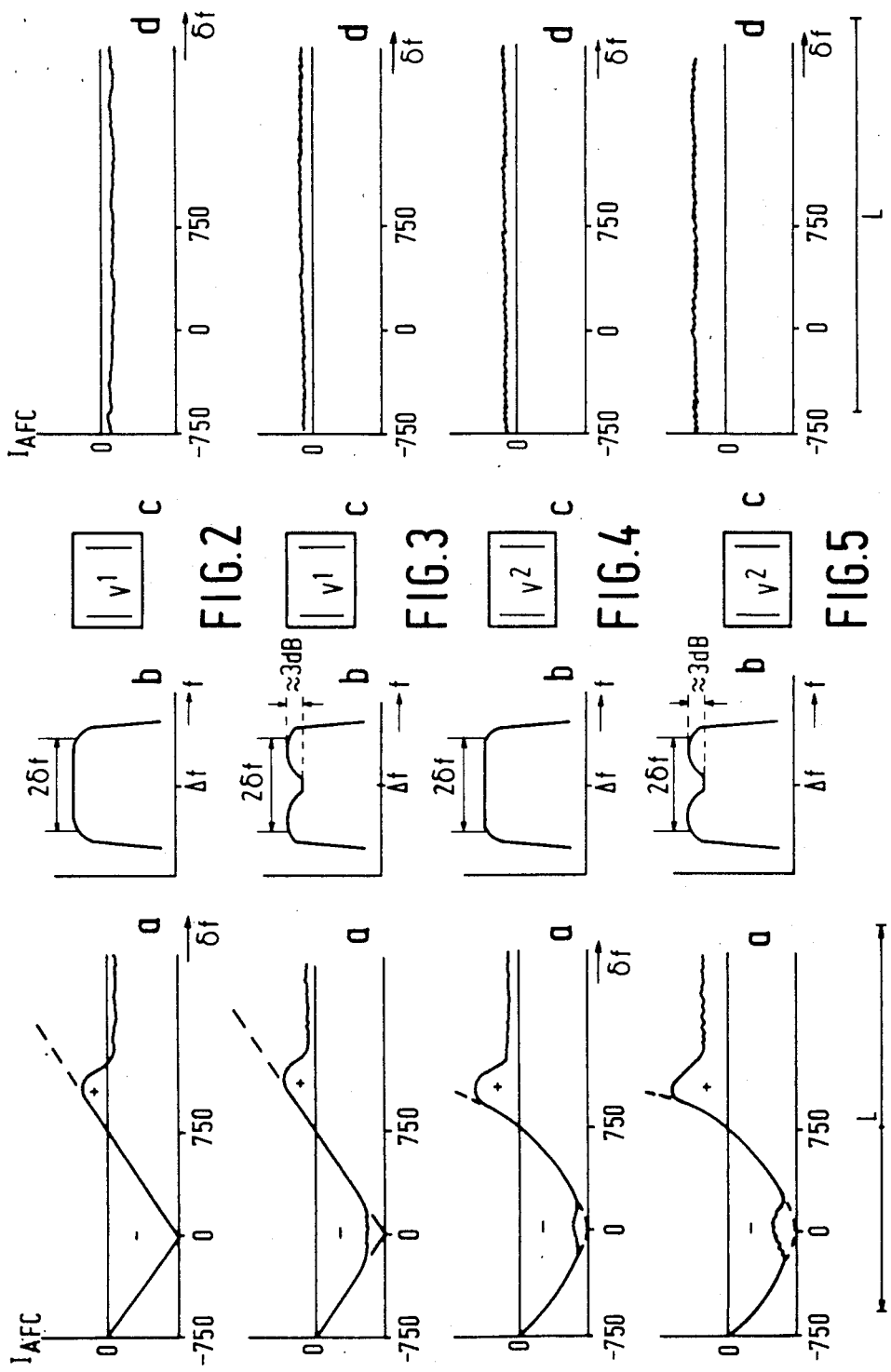
FIGS. 2a–d show characteristics of signals in the receiver of FIG. 1 without the use of the measures according to the invention.
FIGS. 3a–d show characteristics for signals in the receiver of FIG. 1, when a special bandfilter is used.
FIGS. 4a–d show characteristics for signals in the receiver of FIG. 1 if a non-linear rectifier is used in the AFC loop.
FIGS. 5a–d show characteristics for signals in the receiver of FIG. 1 if both a special bandpass filter and a non-linear rectifier circuit are used.

In FIG. 2a, the current $I_{AFC}$ supplied by the differential amplifier 14 is shown as a function of the frequency difference between the frequency of a received signal and the signal frequency $f_L$ produced by the voltage-controlled oscillator 3. Let it be assumed that the bandpass filter 4 has a straight transmission characteristic as shown in FIG. 2b and that the second detector 11 is a rectifier having a linear rectifier characteristic denoted by $|V^1|$ in FIG. 2c. In this Figure, the solid line applies to small input signals and the broken-line portion indicates the deviation of the solid line for large input signals.

The zero point of the frequency axis is located at the reference frequency $\Delta f$ determined by the frequency-voltage converter, so that $\delta f$ is plotted along the frequency axis.

The zero-crossing point of the current axis is determined by the magnitude of the desired value of the frequency $\delta f$, to which normally the voltage-controlled oscillator 3 (VCO) above or below the carrier frequency is tuned. In this embodiment a tuning above the carrier frequency, more specifically $+750$ Hz is opted for. As will be obvious from this Figure, the current $I_{AFC}$ produced is negative for mixed frequencies located between $-750$ Hz and $+750$ Hz and the current $I_{AFC}$ is positive for small signals for mixed frequencies between $+750$ Hz and approximately 1200 Hz. The voltage $V_{AFC}$ produced by the integrator 16 in response to these currents controls the voltage-controlled oscillator 3 such that the frequency of the oscillator is up-controlled for a negative control voltage and is down-controlled for a positive control voltage. As a result thereof the frequency of the oscillator 3 is always adjusted to the desired value of $\delta f$. The integrator 6 ensures that not residual error remains.

In order to realise a largest possible signal-to-noise ratio (S/N) and a best possible channel separation, the bandwidth of the bandfilter 4 is chosen as low as possible. This has the result that if no transmitted signal is received by the receiver and consequently only noise is received within the band, the receiving level is so low that the current $I_{AFC}$ applied to the integrator 6 is below the reference level and is consequently negative, as is shown in FIG. 2d. Moreover, in the example shown in FIG. 2a this also occurs when $\delta f$ is frequency-shifted through more than 1250 Hz in the positive direction relative to $\Delta f$. In both cases the frequency of the VCO 3 is adjusted to higher values of $\delta f$ and the AFC control loop is shifted to its highest frequency value. Consequently, the control loop cannot be pulled in any more by a transmitted signal as the loop is outside the pull-in range.

To obviate this, without widening the passband of the filter, and therefore without decreasing the signal-to-noise ratio, a bandpass filter 4 is used whose transmission characteristic has two peaks located near the ends of the passband of the filter as is shown in FIG. 3b. Because of these two peaks in the passband the amplitudes of signals having frequencies located near the ends of the passband are larger than the amplitudes of signals having intervening frequencies; and more specifically, larger compared with signals having frequencies located near $\delta f = 0$.

These signals are limited in the hard limiter 6. As is known, such a limiter has the property to benefit signals having the largest amplitude at the cost of signals having a smaller amplitude. The ratio in which this occurs is the so-called "capture ratio". This means that, after having passed the limiter 6, the ratio of the number of frequency components located at the ends of the passband relative to the frequency components in the center of the band ($\delta f = 0$) is increased with respect to the ratio of the signals applied thereto.

In the frequency-to-voltage converter 7 frequencies located near the center of the band are converted into a voltage having a much smaller amplitude than frequencies located near the ends. After rectification in the detector 12 the average value of the current $I_{AFC}$ applied to the integrator 16 has increased, because of the joint action of the special bandpass filter 4, the limiter 6 and the frequency-voltage converter 7 relative to the average value for a bandpass filter having a flat transmission characteristic.

Figure 6:
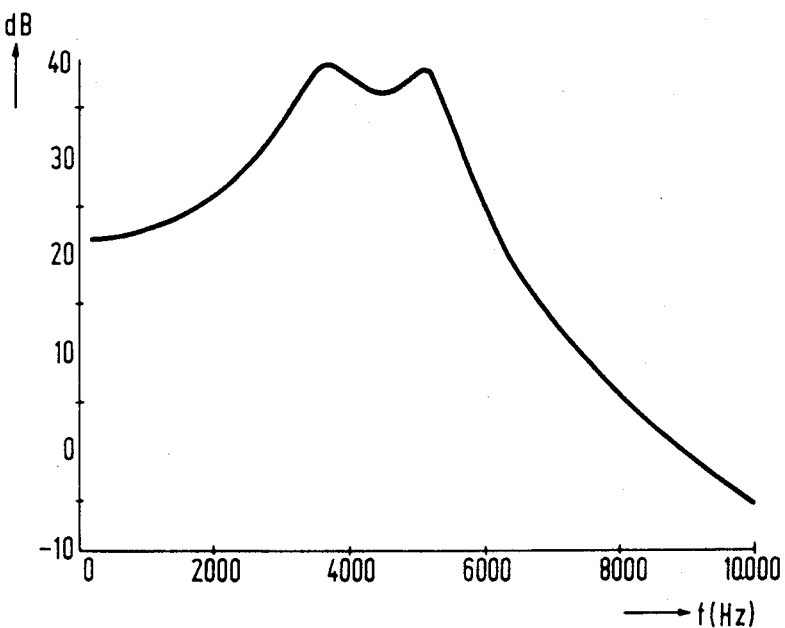
FIG. 6 shows an example of the passband characteristic of the special bandpass filter according to the invention.

A bandpass filter suitable for this purpose is realized by means of the cascade-arrangement of two differently adjusted Sallen and Key filters, whose transmission characteristics are shown in FIG. 6. As this figure shows, the lowest point between two peaks of the transmission characteristic is located at a chosen $\Delta f$ of 4.5 kHz, and the peaks of a $\delta f$ of 750 Hz chosen associated therewith are selected at 3.75 and 5.25 kHz. The difference in level at 4.5 kHz and at 3.75 and 5.25 kHz, respectively is $\approx 3$ dB. The higher average value of the current $I_{AFC}$ obtained with the aid of this filter and applied to the integrator 16 is shown in the FIGS. 3a and 3b, both for the case that the oscillator frequency has such a value that the signal mixed with a received signal is located outside the band, so for a $\delta f$ larger than approximately 1200 Hz, and for the case in which there is no input signal and only white noise is received.

As these Figures clearly show the average value of the signals has increased, more specifically to such an extent that the current $I_{AFC}$ applied to the integrator 6 is located above the zero level for both the above-mentioned cases. Consequently, the integrator 6 applies a positive control voltage $V_{AFC}$ to the oscillator 3 in response to which the frequency of the oscillator is adjusted downwards.

If no input signal is present, the oscillator will be controlled to the desired value of $\delta f$, in this case $+750$ Hz, and will be maintained without residual error. If no input signal is present, then the frequency of the oscillator is controlled down to such an extent that the oscillator clips, so that when off-set occurs between the transmitting frequency and the frequency of the VCO, for example due to drift, the desired signal is always located within the passband of the filter. The pull-in range of the AFC-loop is in principle extended upwards to infinity because of the use of the special bandpass filter 4, without the signal-to-noise level of the receiver being reduced.

When the oscillator 3 has a control range which in the negative direction passes the frequency of the unstable setting point at $-750$ Hz, the limiter 17 shown in FIG. 1 as a broken-line block is indispensable. This limiter limits the control voltage $V_{AFC}$ produced by the integrator 6 to such a value that the maximum frequency offset between the oscillator 3 and the signal to be received can never become larger than $-750$ Hz, for example $-720$ Hz. In this way, a perfect operation of the AFC-loop is ensured in all circumstances without loss in sensitivity.

The width of the pull-in range of the AFC-loop after said measures have been applied is only shown in the FIGS. 5a and 5d, denoted by L. This pull-in range also holds, however, for the FIGS. 3a, 3d, 4a and 4b.

Instead of using a special bandpass filter 4, an increase in the average value of the current $I_{AFC}$ applied to the integrator 6 on receipt of noise can alternatively be affected by using other measures, more specifically by using in the detector 12 a rectifier having a non-linear rectification characteristic instead of a rectifier having a square-law characteristic. This is shown in FIG. 4c by means of $|V^2|$.

As has already been described in the foregoing, the frequency-voltage converter 7 produces converter output signals with an amplitude which increases and decreases linearly from a value of zero corresponding to $\delta f = 0$ (for example, an input noise component having a frequency equal to $f_L$), to values corresponding to their noise components. As these signals are rectified with a square-law characteristic in the detector 12, the amplitude of large-amplitude signals are given preference over signals having a small amplitude. As a result thereof, the current $I_{AFC}$ applied to the integrator 6 has the value shown in FIG. 4a as a function of the frequency $\delta f$ when an input signal is received and has the characteristic shown in FIG. 5d when only white noise is received. By giving the higher signal frequencies the advantage due to the joint operation of the frequency-voltage converter 7 and the detector 12, an increase in the average value of the current $I_{AFC}$ is again realized without deteriorating the signal-to-noise ratio. The signal value on receipt of white noise is consequently again located above the zero level and the pull-in range for positive $\delta f$ is in principle again increased to plus infinity.

Instead of a square-law rectification characteristic it is alternatively possible to use detectors having a higher order rectification characteristic, whereby said effect is still further increased.

It is, however, alternatively possible to use a rectifier having a linear characteristic and to use a frequency-voltage converter 7 having a non-linear, for example a square-law characteristic, mirror-inverted around the reference point $\Delta f$, but together with a bandpass filter 4 having a flat transmission characteristic. The results shown in the FIGS. 4a and 4d are also obtained with a frequency-voltage converter 7 having a square-law characteristic.

It will be obvious that all combinations from the set given by a specific bandpass filter, a non-linear characteristc of the frequency-voltage converter and a non-linear rectification characteristic of the detector 12 can be applied. Thus FIGS. 5a and 5d show the result of a receiver comprising the special bandpass filter 4 (FIG. 5b) and a square-law rectification characteristic (FIG. 5c) of the detector 12. The higher average value of the current $I_{AFC}$ applied to the integrator 6 obtained by the joint operation is clearly shown in these Figures as is also the increase of the noise level near $\delta f = 0$. However, because of its comparatively low value this last increase is not objectionable. An advantage of the large positive current value of $I_{AFC}$ for noise is a shorter settling time of the AFC-loop after switch-on of the receiver.

The additional space obtained may, however, alternatively be used to increase the selectivity of the receiver by somewhat reducing the bandwidth of the bandpass filter.

Because of the fact that the receiver has only one single filter it can be easily produced in integrated circuit technique.

What is claimed is:

1. An frequency-shifted-keyed (FSK) data receiver for receiving an frequency modulated (FM) signal lying within a given band, having a carrier frequency $f_c$ and a given frequency swing $\Delta f$, comprising
   a voltage-controlled oscillator producing a local oscillator signal having a frequency $f_L$ located within said band, shifted in frequency through a given value $\Delta f$ relative to the carrier frequency $f_c$,
   a mixer stage for mixing said local oscillator signal with a received said FM signal,
   a bandpass filter connected to said mixer stage,
   a detection circuit connected to said bandpass filter for recovering the data signal from the sum and difference frequency signals $\Delta f \pm \delta f$ produced by the mixer stage, and
   an automatic frequency control (AFC) loop which includes said detection circuit, said voltage-controlled oscillator, said mixer and said filter,
   characterized in that said loop comprises an integrator, and means for emphasizing the effect of the energy content of signals having frequencies located near the ends of the pass band of the receiver, with respect to signals having intervening frequencies, said means including at most a single bandpass filter, and having an output and
   said integrator is coupled to said output of said means, and generates a control signal for the voltage-controlled oscillator.

2. An FSK data receiver as claimed in claim 1, characterized in that the means comprise one said bandpass filter only and the detection circuit, that the bandpass filter has two peaks located around the signals having frequencies located near the ends of the passband, that the detection circuit comprises a limiter connected to the bandpass filter and a frequency-voltage converter having an output voltage and a characteristic such that the absolute value of the output voltage for the signals having frequencies located near the ends of the passband the bandpass filter exceeds the output voltage for the signals having intervening signal frequencies.

3. An FSK data receiver as claimed in claim 1, characterized in that the means comprise the detection circuit and a non-linear detector arranged in the AFC loop, that the detection circuit comprises a frequency-voltage converter having an output voltage and a characteristic such that the absolute value of the output voltage for the signals having frequencies located near the ends of the passband of the bandpass filter exceeds the output voltage for the signals having intervening signal frequencies.

4. An FSK data receiver as claimed in claim 1, characterized in that the means comprise the detection circuit, that this detection circuit comprises a frequency-voltage converter having an amplitude and phase characteristic which is a non-linear function of the frequency, which characteristic is mirror-symmetrical relative to a reference point; and the AFC loop comprises a rectifier arranged between the converter and the integrator.

5. An FSK data receiver as claimed in claim 2, characterized in that the frequency-voltage converter has an amplitude and phase characteristic which is a linear function of the frequency and whose reference point is located at the frequency $\Delta f$; and the AFC loop comprises a rectifier included between the frequency-voltage converter and the integrator.

6. An FSK data receiver as claimed in claim 5, characterized in that the AFC loop comprises a reference voltage source and a differential amplifier having a current output, the output being connected to the integrator, and that the reference voltage source and the rectifier are connected to inputs of the differential amplifier.

7. An FSK data receiver as claimed in claim 1, characterized in that the AFC loop comprises a limiter connected between the integrator and the voltage-controlled oscillator.

8. An FSK data receiver as claimed in claim 3, characterized in that the frequency-voltage converter has an amplitude and phase characteristic which is a linear function of the frequency and whose reference point is located at the frequency $\Delta f$; and the AFC loop comprises a detector included between the frequency-voltage converter and the integrator, said detector receiving an input voltage derived from the voltage output of said frequency voltage converter, and said detector producing a detector voltage which is the absolute value of said input voltage.

9. An FSK data receiver as claimed in claim 8, characterized in that the AFC loop comprises a reference voltage source and a differential amplifier having a current output, the output being connected to the integrator, and that the reference voltage source and the detector output voltage are connected to inputs of the differential amplifier.

* * * * *